(12) United States Patent
Lim et al.

(10) Patent No.: US 8,774,818 B2
(45) Date of Patent: Jul. 8, 2014

(54) METHOD AND APPARATUS FOR TRANSMITTING DATA IN A WIRELESS COMMUNICATION NETWORK SYSTEM

(75) Inventors: Chae-gwon Lim, Seoul (KR); Sung-yean Cho, Seoul (KR); Sung-ho Choi, Suwon-si (KR); Beom-sik Bae, Suwon-si (KR); Sang-bum Kim, Seoul (KR); Han-na Lim, Seoul (KR)

(73) Assignee: Samsung Electronics Co. Ltd., Suwon-Si (KR)

( * ) Notice: Subject to any disclaimer, the term of this patent is extended or adjusted under 35 U.S.C. 154(b) by 69 days.

(21) Appl. No.: 13/508,326

(22) PCT Filed: Nov. 4, 2010

(86) PCT No.: PCT/KR2010/007758
§ 371 (c)(1),
(2), (4) Date: Jul. 19, 2012

(87) PCT Pub. No.: WO2011/055999
PCT Pub. Date: May 12, 2011

(65) Prior Publication Data
US 2012/0276913 A1 Nov. 1, 2012

(30) Foreign Application Priority Data

Nov. 4, 2009 (KR) .................. 10-2009-0105866
Feb. 18, 2010 (KR) .................. 10-2010-0014703

(51) Int. Cl.
*H04W 72/00* (2009.01)
*H04W 36/00* (2009.01)
*H04W 4/00* (2009.01)

(52) U.S. Cl.
USPC ........ 455/450; 455/436; 455/456.1; 370/328; 370/329

(58) Field of Classification Search
USPC ........ 455/7, 450, 436, 456.1, 435.1; 370/329, 370/328
See application file for complete search history.

(56) References Cited

U.S. PATENT DOCUMENTS

2005/0157726 A1* 7/2005 Vesterinen ................. 370/395.5
2008/0051084 A1* 2/2008 Casati et al. ............... 455/435.1

(Continued)

FOREIGN PATENT DOCUMENTS

EP WO 2008/040412 A1 * 4/2008
KR 10-2006-0001777 A 1/2006

(Continued)

OTHER PUBLICATIONS

3GPP TS 36.413 V8.7.0, (Sep. 2009).*

(Continued)

*Primary Examiner* — Jinsong Hu
*Assistant Examiner* — William Nealon
(74) *Attorney, Agent, or Firm* — Jefferson IP Law, LLP

(57) ABSTRACT

A method and an apparatus for transmitting data in a wireless communication network are provided. A base station having information of an idle mode user equipment transmits a connecting operation mode to the user equipment when the idle mode user equipment is connected to the base station. The user equipment transmits a small amount of data together with a connection request completion message to the base station. The base station transmits, over a network, the data received from the user equipment, without being interlinked with a mobility management entity, and the user equipment returns back to an idle operation mode after data transmission. Thus, the overhead required to support signaling of the base station for acquiring context information of the user equipment can be reduced in order to provide the user equipment with an efficient data transmission environment.

35 Claims, 12 Drawing Sheets

(56) References Cited

U.S. PATENT DOCUMENTS

2009/0154408 A1* 6/2009 Jeong et al. .................. 370/329
2009/0170426 A1* 7/2009 Jung et al. ........................ 455/7
2009/0270111 A1* 10/2009 Nakamura et al. ......... 455/456.1
2010/0265884 A1* 10/2010 Vikberg et al. ............... 370/328

FOREIGN PATENT DOCUMENTS

| KR | 10-2007-0073343 A | 7/2007 |
| KR | WO 2007/078159 A1 * | 7/2007 |
| KR | 10-2007-0102168 A | 10/2007 |
| KR | WO 2009/038300 A1 * | 3/2009 |
| WO | WO 2009/056932 A2 * | 5/2009 |

OTHER PUBLICATIONS

3GPP TS 36.331 V8.7.0, (Sep. 2009).*
3GPP TS 24.301 V8.3.0 (Sep. 2009).*
3GPP TS 23.401 V9.2.0 (Sep. 2009) 3GPP TR 23.882 V8.0.0 (Sep. 2008).*

* cited by examiner

METHOD AND APPARATUS FOR TRANSMITTING DATA IN A WIRELESS COMMUNICATION NETWORK SYSTEM

PRIORITY

This application is a National Stage application under 35 U.S.C. §371 of an International application filed on Nov. 4, 2010 and assigned application No. PCT/KR2010/007758, and claims the benefit under 35 U.S.C. §119(a) of Korean patent applications filed in the Korean Industrial Property Office on Nov. 4, 2009 and Feb. 18, 2010 and respectively assigned Serial Nos. 10-2009-0105866 and 10-2010-0014703, the entire disclosure of each of which is hereby incorporated by reference.

BACKGROUND OF THE INVENTION

1. Field of the Invention

The present invention relates to a method and apparatus for transmitting data in a radio communication network. More particularly, the present invention relates to a method and apparatus for a User Equipment (UE) to transmit data when the UE that is in an idle mode accesses an evolved-Node B (eNB) for transmission of a small amount of data.

2. Description of the Related Art

In general, Universal Mobile Telecommunications System (UMTS) is a $3^{rd}$ Generation (3G) communication system that is based on Global System for Mobile communications (GSM) and General Packet Radio Services (GPRS), and that uses Wideband Code Division Multiple Access (WCDMA). The $3^{rd}$ Generation Partnership Project (3GPP), which works for standardization of UMTS, has proposed Evolved Packet System (EPS) that corresponds to a next generation communication system of UMTS such as a Long Term Evolution (LTE) system, for embodying a high-speed packet-based communication.

FIG. 1 illustrates a configuration of an LTE radio communication network according to the related art.

As shown in FIG. 1, the radio communication network may include an eNB 102, a Mobility Management Entity (MME) 104, a Serving GateWay (S-GW) 106, a Packet Data Network GateWay (PDN-GW) 108, and a UE 100.

The eNB 102 may be an eNB that manages a macrocell. Here, for ease of description, the terms "macrocell" and "eNB" may be used interchangeably, although the macrocell is a cell in a general cellular system and the eNB 102 is an eNB that manages and controls the macrocell.

The eNB 102 may be connected to the UE 100 through a radio channel, and may control a radio resource. For example, the eNB 102 may generate control information required in the macrocell as system information and broadcast the system information, or may allocate radio resources so as to perform, with the UE 100, transmission and reception of data or control information. In addition, the eNB 102 may collect information of channel measurement results of a current cell and adjacent cells from the UE 100 so as to determine a handover, and may command the UE 100 to perform the handover. Accordingly, the eNB 102 may include a control protocol, such as a radio resource protocol associated with radio resource management and the like.

The MME 104 may manage a mobility of the UE 100 that is in an idle mode, and may select the PDN-GW 108 and the S-GW 106 for data transmission of the UE 100. In addition, the MME 104 may perform functions associated with roaming and authentication of the UE 100. The MME 104 may process a bearer signal occurring from the UE 100.

The S-GW 106 may function as a mobile anchor when a handover occurs between eNBs or movement occurs between 3GPP radio networks. The PDN-GW 108 may allocate an Internet Protocol (IP) address of the UE 100, may perform connecting of a core network and a packet data network, and may function as a mobile anchor when movement occurs between a 3GPP radio network and a non-3GPP radio network. Also, the PDN-GW 108 may determine a bearer band to be provided to a subscriber, and may perform forwarding and routing of packet data.

When the UE 100 accesses the eNB 102, the UE 100 may access an Internet network 110 through use of a data transmission path 110 that goes through the eNB 102, the S-GW 106, and the PDN-GW 108. To implement the above, a related signaling may be transferred via a path that goes through the UE 100, the eNB 102, the MME 104, the S-GW 106, and the PDN-GW 108.

FIG. 2 illustrates a process where a UE that is in an idle mode transmits data in an LTE radio communication network according to the related art.

Referring to FIG. 2, a UE 200 that is in an idle mode may transmit a Radio Resource Control (RRC) connection request message to an eNB 202 in operation 210. The RRC connection request message may include an Identifier (ID) of the UE 200, that is, a System Architecture Evolution (SAE) Temporary Mobile Subscriber Identifier (S-TMSI). The eNB 202 may transmit an RRC connection setup message to the UE 200 in operation 212, and the UE 200 may transfer an RRC connection setup complete message to the eNB 202 in operation 214. The RRC connection setup complete message may include a Non-Access Stratum (NAS) message that the UE 200 transmits to an MME 204. The NAS message may be a message to request a service from an NAS layer that connects the UE 200 and the MME 204 so as to switch the UE 200 from an idle mode to an active mode.

The eNB 202 may notify of the connection of the UE 200 to the MME 204 through INITIAL UE MESSAGE in operation 216, and may transmit the NAS message received in operation 214 to the MME 204.

In operation 218, the MME 204 may transmit, to the eNB 202, security information of the UE 200, information associated with a data bearer of the UE 200, information associated with an S-GW 206 to which the eNB 202 is to transmit data received from the UE 200, that is, S1-U UL information (uplink bearer GPRS Tunneling Protocol (GTP) Tunnel ID (TEID)), an IP address of the S-GW 206, and context information of the UE 200 such as mobility management information of the UE 200, through use of an INITIAL CONTEXT SETUP REQUEST message.

In operations 220 and 222, the eNB 202 may set an Access Stratum (AS) security and a data bearer between the UE 200 and the eNB 202 in conjunction with the UE 200 based on the context information of the UE 200 received in operation 218, through use of an RRC connection reconfiguration message and an RRC connection reconfiguration complete message.

In operation 224, the eNB 202 may inform the MME 204 that the context of the UE 200 and the data bearer are successfully set, through use of an INITIAL CONTEXT SETUP RESPONSE message, and may also transmit information associated with the eNB 202 required for transmitting data from the S-GW 206 to the UE 200, that is, S1-U DL information of the UE 200 (downlink bearer GTP TEID and an IP address of the eNB 202). That is, the MME 204 may transmit, to the S-GW 206, the downlink bearer GTP TEID of the UE 200 and the IP address of the eNB 202 received from the eNB 202 in operation 224, through use of an Update Bearer Request message in operation 226, and may receive a response message from the S-GW 206 through use of an Update Bearer Response message in operation 228.

Through the processes as described in the foregoing, the UE 200 may transmit data after operation 222, and the data transmitted from the UE 200 may be transmitted to an Internet network via the eNB 202, the S-GW 206, and the PDN-GW 208 in operation 230.

As shown in FIG. 2, to transmit data, the UE 200 that is in an idle mode may require ten signalings that are transmitted and received in operations 210 through 228. This condition is equivalently applied even when a significantly small amount of data is transmitted, such as an alarm message, a power consumption measurement results reporting message, and the like. Also, when the amount of data is significantly small, the signaling overhead necessary for support of the transmitted and received data may be even greater than the amount of data to be transmitted. Accordingly, there is a need for a method to overcome these drawbacks.

SUMMARY OF THE INVENTION

Aspects of the present invention are to address at least the above-mentioned problems and/or disadvantages and to provide at least the advantages described below. Accordingly, an aspect of the present invention is to provide a radio communication network structure and a method thereof, which decreases signaling overhead of data transmission through use of context information of an idle mode User Equipment (UE) that an evolved Node B (eNB) stores in advance, when the idle mode UE accesses the eNB, and thus may provide an effective data transmission environment to the UE.

In accordance with an aspect of the present invention, a method of transmitting data in a radio communication network is provided. The method includes transmitting, by an eNB, a radio resource connection setup message to a UE when the UE that is in an idle mode accesses the eNB, receiving data and a radio connection setup complete message from the UE in response to the radio resource connection setup message, transmitting, by the eNB, the data received from the UE to a Mobility Management Entity (MME), receiving, by the eNB, a UE context release message from the MME, and releasing Radio Resource Control (RRC) connection with the UE.

In accordance with another aspect of the present invention, a method of transmitting data in a radio communication network is provided. The method includes receiving, by an MME, a connection notification message associated with a UE from an eNB when the UE that is in an idle mode accesses the eNB, transmitting, by the MME, data to a Serving GateWay (S-GW) when the data transmitted from the UE is received with the connection notification message, and transmitting, by the MME, a UE context release message to the eNB.

In accordance with another aspect of the present invention, a radio communication system that transmits and receives data in a radio communication network is provided. The system includes an eNB to receive a radio connection setup complete message including data from a UE when an RRC connection is set up with the UE in response to a request from the UE that is in an idle mode, to transmit the data received from the UE to an MME, to receive a UE context release message from the MME, and to release the RRC connection with the UE, and the MME to receive, from the eNB, a connection notification message associated with the UE, to transmit data to an S-GW when the data transmitted from the UE is received with the connection notification message, and to transmit the UE context release message.

In accordance with another aspect of the present invention, a method of transmitting data in a radio communication network is provided. The method includes transmitting, by an MME to an S-GW, a bearer create session request message including a data transport indicator that indicates that the MME is capable of directly transmitting data to the UE, in response to a connection request from the UE, receiving, by the MME, a bearer create session response message from the S-GW, and transmitting context information of the UE to an eNB, and receiving, by the MME, data to be transmitted to the UE from the S-GW when a bearer is released since the UE is switched into an idle mode, and transmitting the data to the UE.

In accordance with another aspect of the present invention, a method of transmitting data in a radio communication network is provided. The method includes receiving, by an S-GW from an MME, a bearer create session request message including a data transport indicator indicating that the MME is capable of directly transmitting data to a UE, in response to a connection request from the UE, and registering, by the S-GW, whether the MME is capable of providing data transport support with respect to a bearer of the data, transmitting, by the S-GW, the bearer create session request message to a Packet Data Network GateWay (PDN-GW), receiving a bearer create session response message, transmitting the bearer create session response message to the MME, receiving, by the S-GW from the PDN-GW, data to be transmitted to the UE after the UE is switched into an idle mode and a bearer is released, and determining, by the S-GW, that the MME is capable of directly transmitting the data to the UE, based on the data transport indicator, and transmitting the data to the MME.

In accordance with another aspect of the present invention, a radio communication system that transmits and receives data in a radio communication network is provided. The system includes an MME to transmit a bearer create session request message including a data transport indicator that indicates that the MME is capable of directly transmitting data to a UE, in response to a connection request from the UE, to receive a bearer create session response message, to transmit context information of the UE to an eNB, and to transmit data to the UE when the data to be transmitted to the UE is received after the UE is switched into an idle mode and a bearer is released, and an S-GW to receive the bearer create session request message from the MME, to register whether the MME is capable of providing data transport support with respect to the bearer of the data, to transmit the bearer create session request message to a PDN-GW, to receive a bearer create session response message, to determine that the MME is capable of directly transmitting data to the UE based on the data transport indicator when the data to be transmitted to the UE is received from the PDN-GW after the UE is switched into an idle mode and the bearer is released, and to transmit the data to the MME.

In accordance with another aspect of the present invention, a method of transmitting data in a radio communication network is provided. The method includes receiving, by a UE from an eNB, information required for generating Access Stratum (AS) security information when the UE that is in an idle mode accesses the eNB, generating, by the UE, a new AS security context based on the AS security information received from the eNB, transmitting, by the UE, a connection request complete message and data based on the generated AS security context, and switching, by the UE, a mode into an idle mode.

In accordance with another aspect of the present invention, a method of transmitting data in a radio communication network is provided. The method includes transmitting, by an eNB, information required for generating AS security information for AS security with the UE when a UE that is in an idle mode accesses the eNB, receiving, by the eNB from the UE, a connection request complete message and data based on a new AS security context generated by the UE through use of AS security information received from the eNB, and transmitting, by the eNB to a network, the data received from the UE based on uplink information stored in advance.

In accordance with another aspect of the present invention, a radio communication system that transmits and receives data in a radio communication network is provided. The system includes a UE to transmit a radio resource connection request message in an idle mode, to receive information required for generating AS security information so as to generate a new AS security context, to transmit an access request complete message and data based on the generated AS security context, and to switch a mode into an idle mode, and an eNB to transmit the information required for generating the AS security information for AS security with the UE when the UE that is in an idle mode accesses the eNB, to receive the access request complete message and the data from the UE based on the new AS security context generated by the UE, and to transmit the data received from the UE to a network based on uplink information stored in advance.

In accordance with another aspect of the present invention, a method of transmitting data in a radio communication network is provided. The method includes receiving, by a UE from an eNB, an indicator indicating that AS security information that is previously used for communication with the UE is to be reused, when the UE that is in an idle mode accesses the eNB, transmitting, by the UE, a connection request complete message and data through use of a previously used AS security context based on the indicator received from the eNB, and switching, by the UE, a mode into the idle mode.

In accordance with another aspect of the present invention, a radio communication system that transmits and receives data in a radio communication network is provided. The system includes a UE to transmit a radio resource connection request message in an idle mode, to receive an indicator indicating that previously used AS security information is to be reused, to transmit a connection request complete message and data based on a previously used AS security context, and to switch a mode into an idle mode, and an eNB to transmit the indicator indicating that the AS security information set for previous communication with the UE when the UE that is in an idle mode accesses the eNB, to receive the connection request complete message and data from the UE based on the previously used AS security context, and to transmit the data received from the UE to a network based on uplink information stored in advance.

In accordance with another aspect of the present invention, a method of transmitting data in a radio communication network is provided. The method includes receiving, by a UE from an eNB, a radio resource connection setup message when the UE that is in an idle mode accesses the eNB, transmitting, by the UE to the eNB, a radio connection setup complete message including data, and receiving, by the UE, a context release message from the eNB that transmits the data to a network, and switching a mode into an idle mode.

Other aspects, advantages, and salient features of the invention will become apparent to those skilled in the art from the following detailed description, which, taken in conjunction with the annexed drawings, discloses exemplary embodiments of the invention.

According to exemplary embodiments of the present invention, when a UE that is in an idle mode accesses an eNB for data transmission, the eNB decreases signaling for obtaining context information of the UE and thus, may provide the UE with an efficient data transmission environment.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
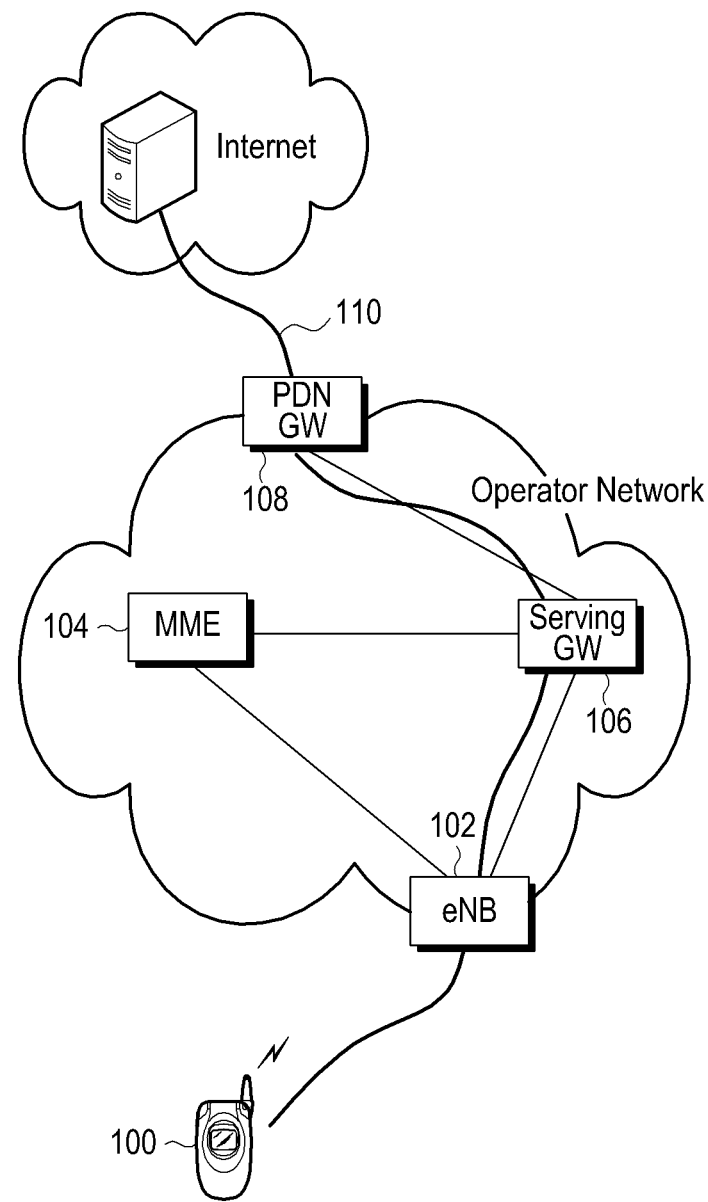
FIG. 1 is a diagram illustrating a configuration of a radio communication network according to the related art.
Figure 2:
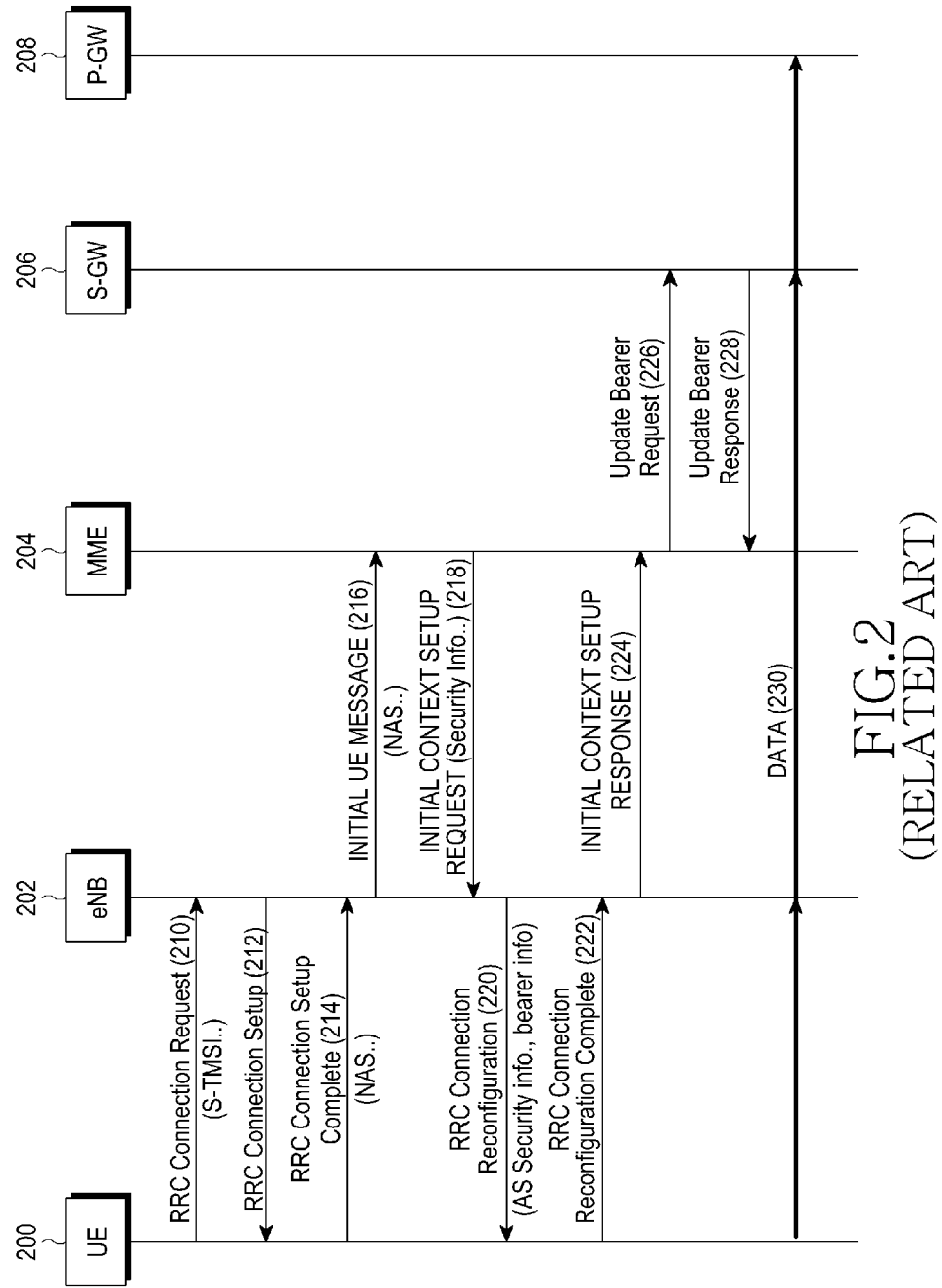
FIG. 2 is a diagram illustrating a method where a User Equipment (UE) that is in an idle mode transmits data in a radio communication network according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although terms used in the following description of exemplary embodiments of the present invention are based on the 3$^{rd}$ Generation Partnership Project Long Term Evolution (3GPP LTE) system standards, it is to be understood that the terms are not intended to limit application of the present invention to any particular standard. Also, in exemplary embodiments of the present invention, a cell and an evolved-Node B (eNB) may be directed to the same meaning. Accordingly, a macrocell and the eNB may be directed to the same meaning.

Exemplary embodiments of the present invention are to simplify a data transmission procedure of a User Equipment (UE) when the UE transmits a small amount of data. For example, when a UE is installed as an intrusion detecting device, such as in a home, and is equipped with an LTE module, the UE may not need to perform transmission and reception of data with a network at normal times, but may only need to transmit an alarm message to the network when an intrusion is detected. Also, the UE may be returned to an idle mode immediately after transmitting the alarm message. Similarly, when a device that measures an amount of consumed power is equipped with an LTE module, the UE may only be required to transmit a measurement value of the amount of consumed power to the network at regular intervals, and may not need to perform transmission and reception of data with the network. Also, the UE may be stationary or may not be outside of a predetermined range and thus, may always communicate with the same eNB. Accordingly, when exemplary embodiments of the present invention are applied to a case where the stationary UE transmits a small amount of data, signaling may be decreased and an effective data transmission environment may be provided to the UE.

Figure 3:
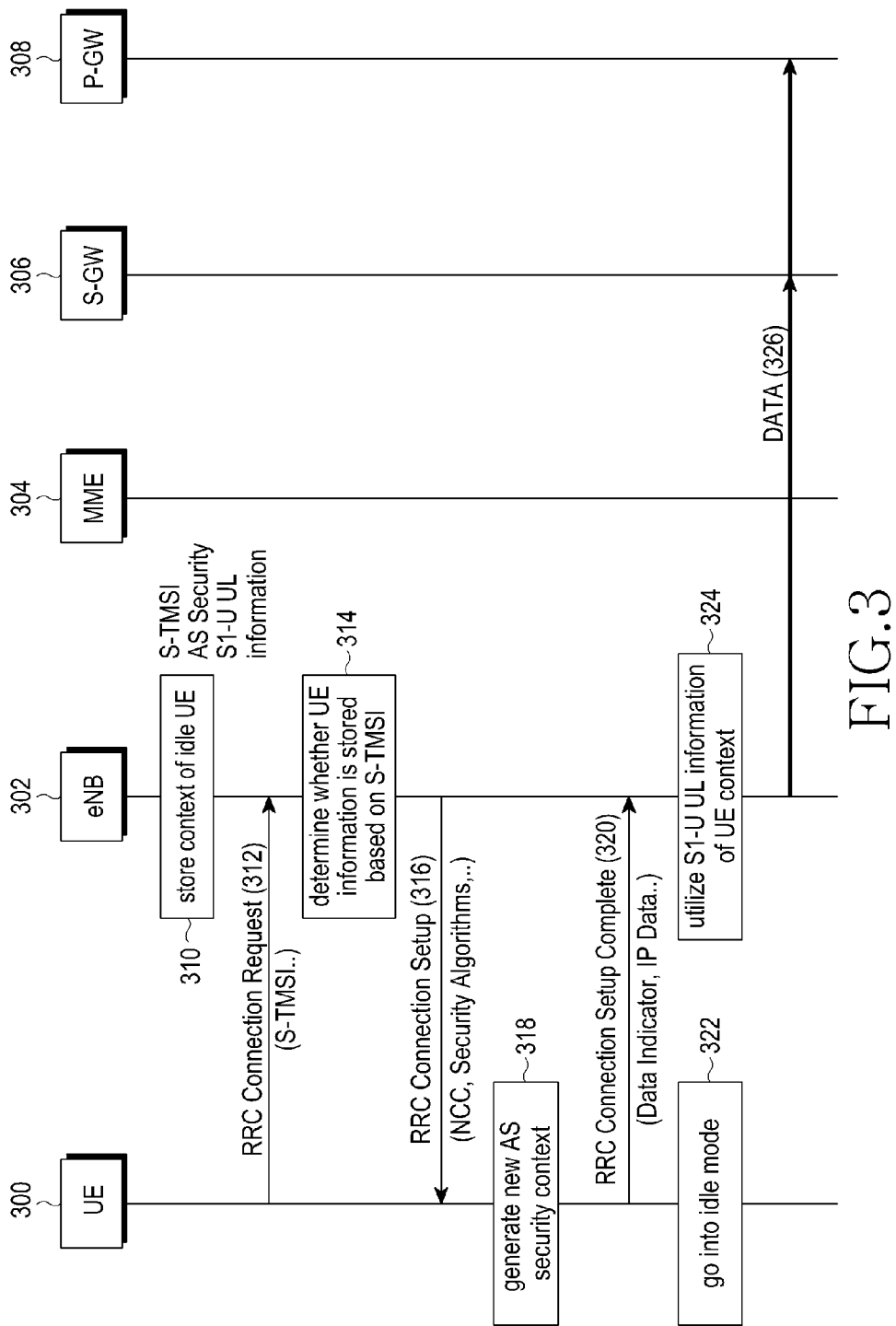
FIG. 3 is a diagram illustrating a method where a UE that is in an idle mode accesses an evolved Node B (eNB), updates Access Stratum (AS) security information, and transmits data according to a first exemplary embodiment of the present invention.

FIG. 3 illustrates a method where a UE that is in an idle mode accesses an eNB, updates Access Stratum (AS) security information, and transmits data according to a first exemplary embodiment of the present invention.

Referring to FIG. 3, an eNB 302 stores a System Architecture Evolution (SAE) Temporary Mobile Subscriber Identifier (S-TMSI) corresponding to information associated with a UE 300 that is in an idle mode, AS security information associated with security information between the UE 300 and the eNB 302, and S1-U UL (User Plane Uplink) information to be used for transmitting data from the eNB 302 to a Serving GateWay (S-GW) 306, in advance. Although the UE 300 that receives a service from the eNB 302 is switched into an idle mode, the eNB 302 may not remove information used during a previous access, and may store the information in operation 310. In operation 312, the UE 300 that is in an idle mode may transmit, to the eNB 302, a Radio Resource Control (RRC) connection request message along with the S-TMSI information associated with the UE 300, for data transmission. As circumstances demand, the UE 300 may transmit a short data indicator indicating that a small amount of data is to be transmitted to the eNB 302. In operation 314, based on the S-TMSI information of the UE 300, the eNB 302 may determine whether it includes information associated with the UE 300. When the eNB 302 stores the information associated with the UE 300 of the corresponding ID, the eNB 302 may transmit an RRC connection setup message to the UE 300 in operation 316, in response to the RRC connection request message received in operation 312, along with information associated with an AS security algorithm and a Next-hop Chaining Count (NCC) value required for generating new AS security information. In operation 318, the UE 300 may generate and set a new AS security context with the eNB 302. In operation 320, the UE 300 may transfer an RRC connection setup complete message to the eNB 302, and may transmit the desired data, as opposed to a Non-Access Stratum (NAS) message. The data may be secured based on the AS security information newly generated in operation 318. In this example, as circumstances demand, an indicator, that is, an Internet Protocol (IP) data indicator, may be transmitted so as to indicate that the data, as opposed to the NAS message, is transmitted. When the eNB 302 recognizes that the message received from the UE 300 is the data, as opposed to the NAS message, the eNB 302 may transfer the data to the S-GW 306 based on the S1-U UL information from among UE information stored in the eNB 302, and the S-GW 306 may transfer the data received from the eNB 302 to a Packet Data Network-GateWay (PDN-GW) 308 in operations 324 and 326. The UE 300 that transmits the data to the eNB 302 in operation 320 may be switched into an idle mode again in operation 322. In this exemplary implementation, the eNB 302 does not exchange messages with a Mobility Management Entity (MME) 304, thus reducing signaling overhead.

Figure 4:
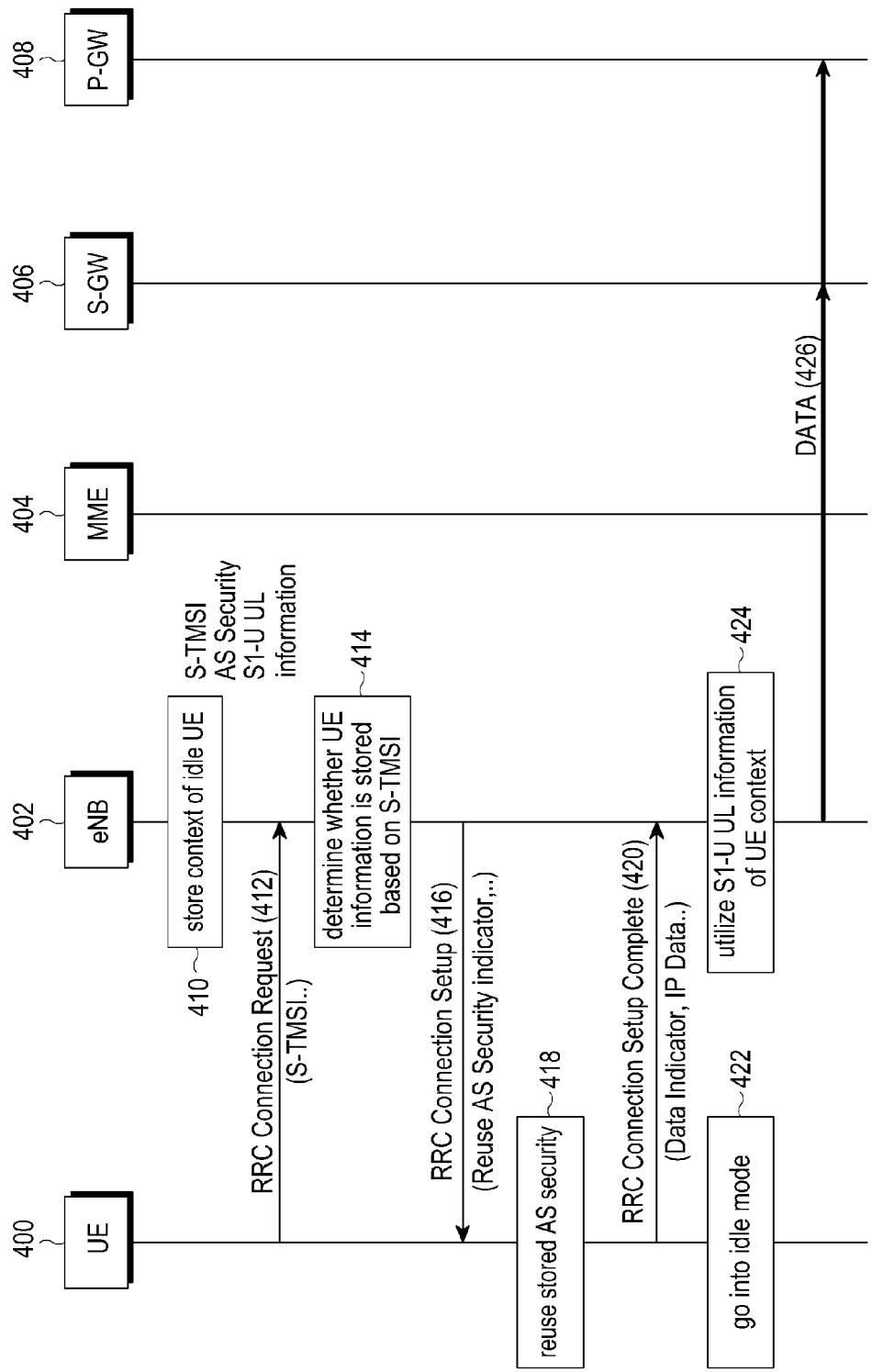
FIG. 4 is a diagram illustrating a method where a UE that is in an idle mode accesses an eNB, reuses AS security information, and transmits data according to a second exemplary embodiment of the present invention.

FIG. 4 illustrates a method where a UE that is in an idle mode accesses an eNB, reuses AS security information, and transmits data according to a second exemplary embodiment of the present invention Referring to FIG. 4, an eNB 402 may store S-TMSI information corresponding to information associated with a UE 400 that is in an idle mode, AS security information corresponding to security information between the UE 400 and the eNB 402, and S1-U UL information to be used for transmitting data from the eNB 402 to an S-GW 406, in advance. Although the UE 400 that receives a service from the eNB 402 is switched into an idle mode, the eNB 402 may not remove information used during a previous access, and may store the information in operation 410. In operation 412, the UE 400 that is in an idle mode may transmit, to the eNB 402, an RRC connection request message for data transmission, along with the S-TMSI information of the UE 400. As circumstances demand, the UE 400 may also transfer a short data indicator indicating that a small amount of data is to be transmitted to the eNB 402. In operation 414, based on the S-TMSI information, the eNB 402 may determine whether it stores information associated with the UE 400. When the eNB 402 stores the information associated with the UE 400, the eNB 402 may transmit an RRC connection setup message to the UE 400 in operation 416, in response to the RRC connection request message received in operation 412, along with a Reuse AS security indicator corresponding to an indicator that instructs to reuse the AS security information used when the UE 400 has previously accessed the eNB 402. In operation 418, the UE 400 may reset an existing AS security context with the eNB 402. In operation 420, the UE 400 may transfer an RRC connection setup complete message to the eNB 402. In this example, the UE 400 may transmit the desired data, as opposed to an NAS message. The data may be secured based on the AS security information. As circumstances demand, an IP data indicator may also be transmitted to the eNB 402 so as to indicate that the data, as opposed to the NAS message, is transmitted. When the eNB 402 recognizes that the message received from the UE 400 is the data, as opposed to the NAS message, the eNB 402 may transfer the data to the S-GW 406 based on the S1-U UL information from among UE information stored in the eNB 402, and the S-GW 406 may transfer the data received from the eNB 402 to a PDN-GW 408 in operations 424 and 426. The UE 400 that transmits the data to the eNB 402 in operation 420 may be switched into an idle mode again in operation 422. In this exemplary implementation, the eNB 402 does not exchange messages with an MME 404, thus saving resources otherwise used for signaling.

Figure 5:
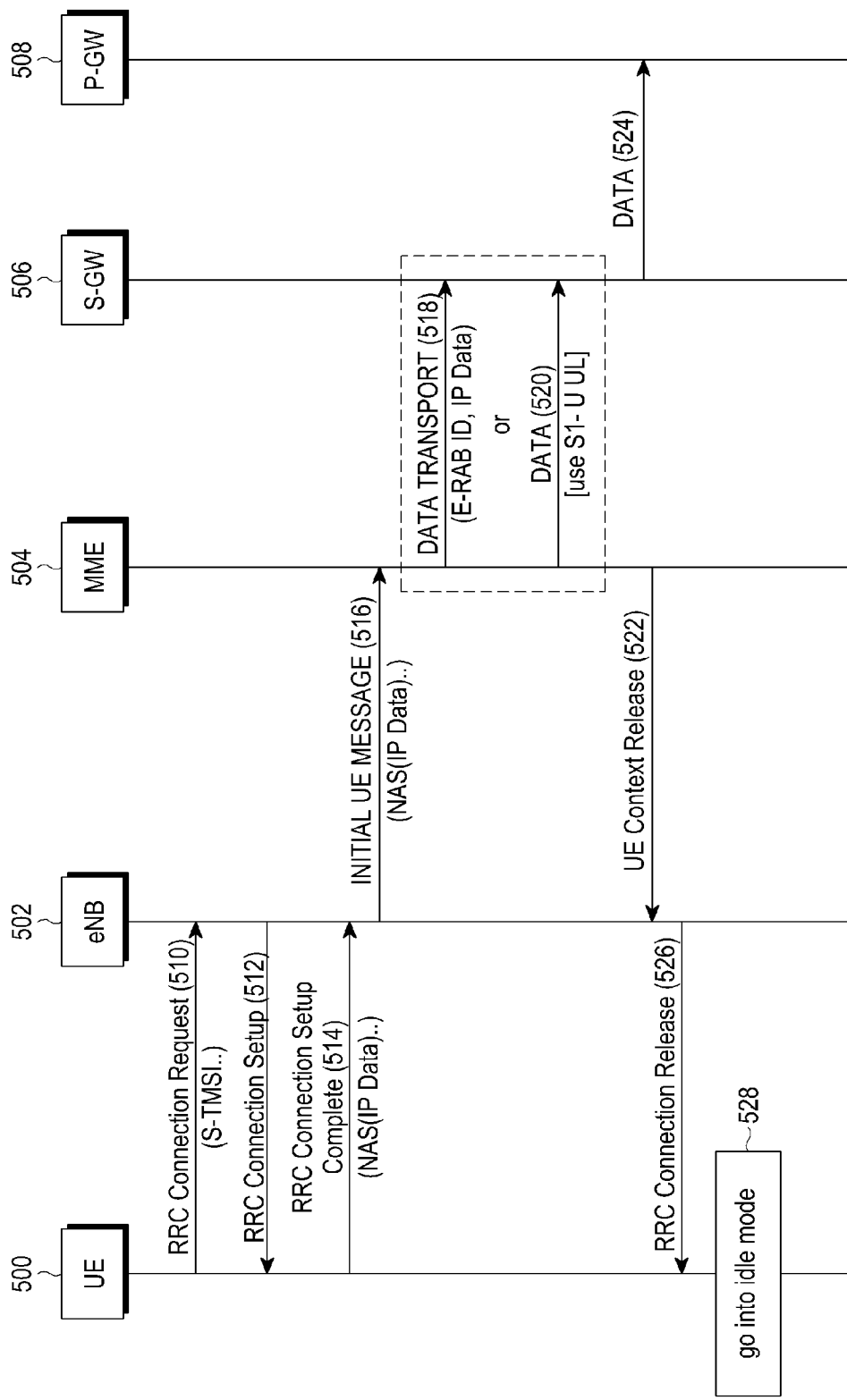
FIG. 5 is a diagram illustrating a method where a UE that is in an idle mode accesses an eNB and transmits data to a Mobility Management Entity (MME), and the MME transfers the data to a Serving GateWay (S-GW), according to a third exemplary embodiment of the present invention.

FIG. 5 illustrates a method where a UE that is in an idle mode accesses an eNB and transmits data to an MME, and the MME transfers the data to an S-GW, according to a third exemplary embodiment of the present invention.

Referring to FIG. 5, a UE 500 that is in an idle mode may transmit an RRC connection request message to an eNB 502 for data transmission in operation 510. In operation 512, the eNB 502 may transmit an RRC connection setup message to the UE 500 in response to the RRC connection request message received in operation 510. Accordingly, the UE 500 may transmit an RRC connection setup complete message including an NAS message, to the eNB 502 in operation 514. In this example, the NAS message may be transmitted by including IP data in the NAS message, or the NAS message may be transmitted along with the IP data. In operation 516, the eNB 502 may transfer, to an MME 504, the NAS message including the IP data transferred from the UE 500 or the NAS message and the IP data. In this example, an NAS message provided in a new form may be added to transfer the IP data, or an indicator indicating that the IP data is included in the existing NAS message may be added.

The MME 504 that receives the NAS message from the eNB 502 may determine whether the IP data is included in the NAS message when a form of the NAS message is for data transmission or when the indicator indicating that an NAS message includes an IP data exists. When the IP data is determined to be included in the NAS message received from the eNB 502, the MME 504 may transfer the data transferred from the eNB 502 to an S-GW 506 through use of a DATA TRANSPORT message in operation 518, or may transfer the data to the S-GW 506 through use of S1-U UL information in operation 520. In operation 524, the S-GW 506 may transfer the data transferred from the MME 504 to a PDN-GW 508. The MME 504 that transmits the data in operation 518 or operation 520, may transmit a UE context release message to the eNB 502 in operation 522, so as to switch the UE 500 into an idle mode. The eNB 502 that receives the UE context release message may transfer an RRC connection release message to the UE 500 in operation 526, so as to disconnect an RRC connection with the UE 500, and may be switched into an idle mode again in operation 528. When an indicator that requests additional data transmission is included in the NAS message of the UE 500 in operation 516, the MME 504 may not transfer the UE context release message in operation 522, and may transmit an INITIAL CONTEXT SETUP REQUEST message to the eNB 502 as described above in operation 218 so that operations 218 through 230 may be performed.

Figure 6:
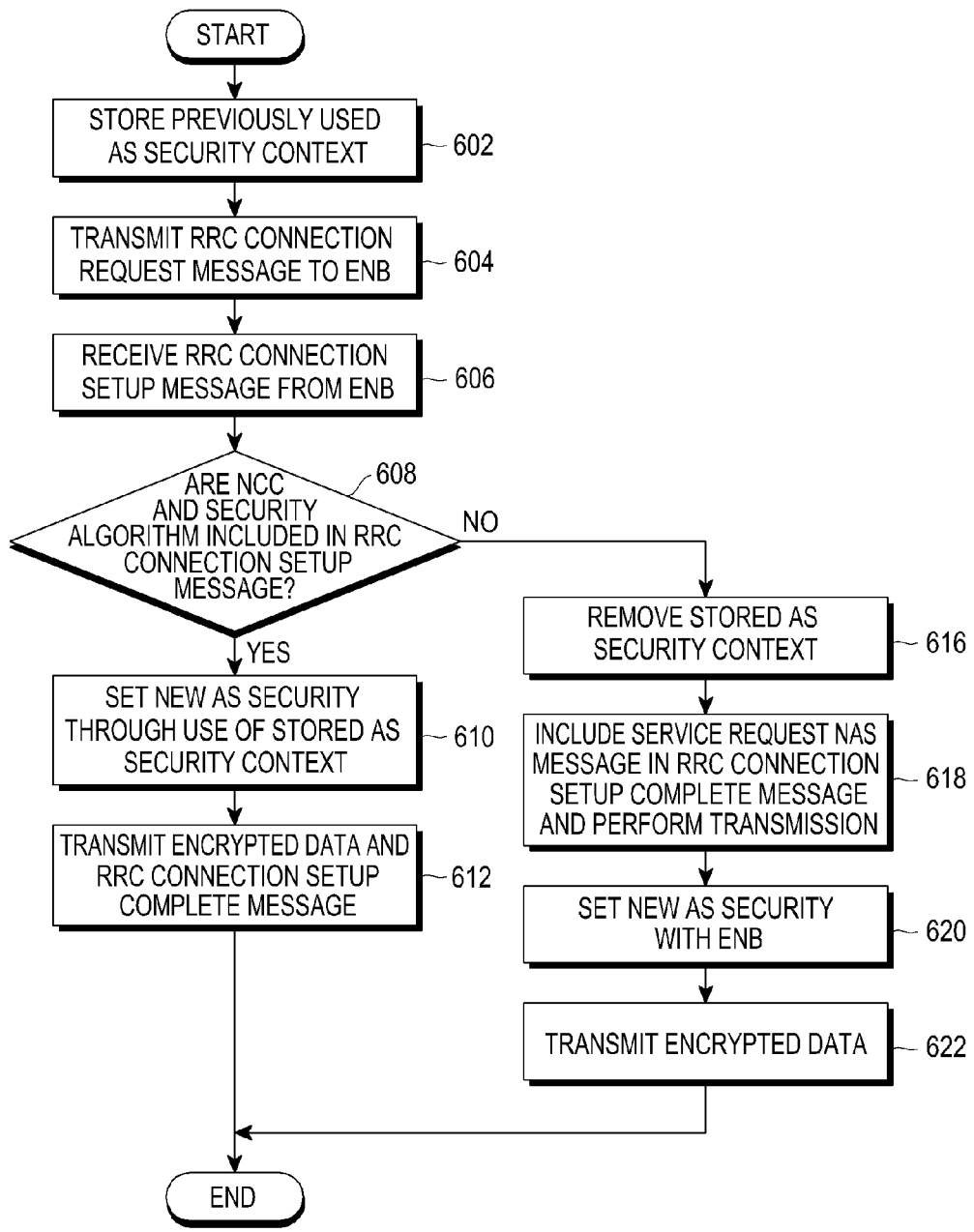
FIG. 6 illustrates an operation of a UE according to the first exemplary embodiment of the present invention.

FIG. 6 illustrates an operation of a UE according to the first exemplary embodiment of the present invention.

Referring to FIG. 6, a UE that is in an idle mode may continuously store AS security information that is used for a previous connection, in operation 602, and may transmit an RRC connection request message to an eNB in operation 604 when data needs to be transmitted. In operation 606, the UE may receive an RRC connection setup message from the eNB in response to the RRC connection request message received in operation 604. When a message received in operation 606 includes an NCC value and an AS security algorithm or other security information generating indicators are included in operation 608, the UE may generate information associated with AS security in operation 610. In operation 612, the UE may transfer, to the eNB, data encrypted through use of updated information associated with AS security along with an RRC connection setup complete message or may transfer the encrypted data by including the encrypted data in the RRC connection setup complete message.

When a security information update indicator is not included in the RRC connection setup message in operation 608, the UE may remove the stored AS security information in operation 616, and may include an NAS message in the RRC connection setup complete message and may transmit the RRC connection setup complete message in operation 618. The UE may set a new AS security based on a command from the eNB in operation 620, and may transmit the encrypted data in operation 622.

Figure 7:
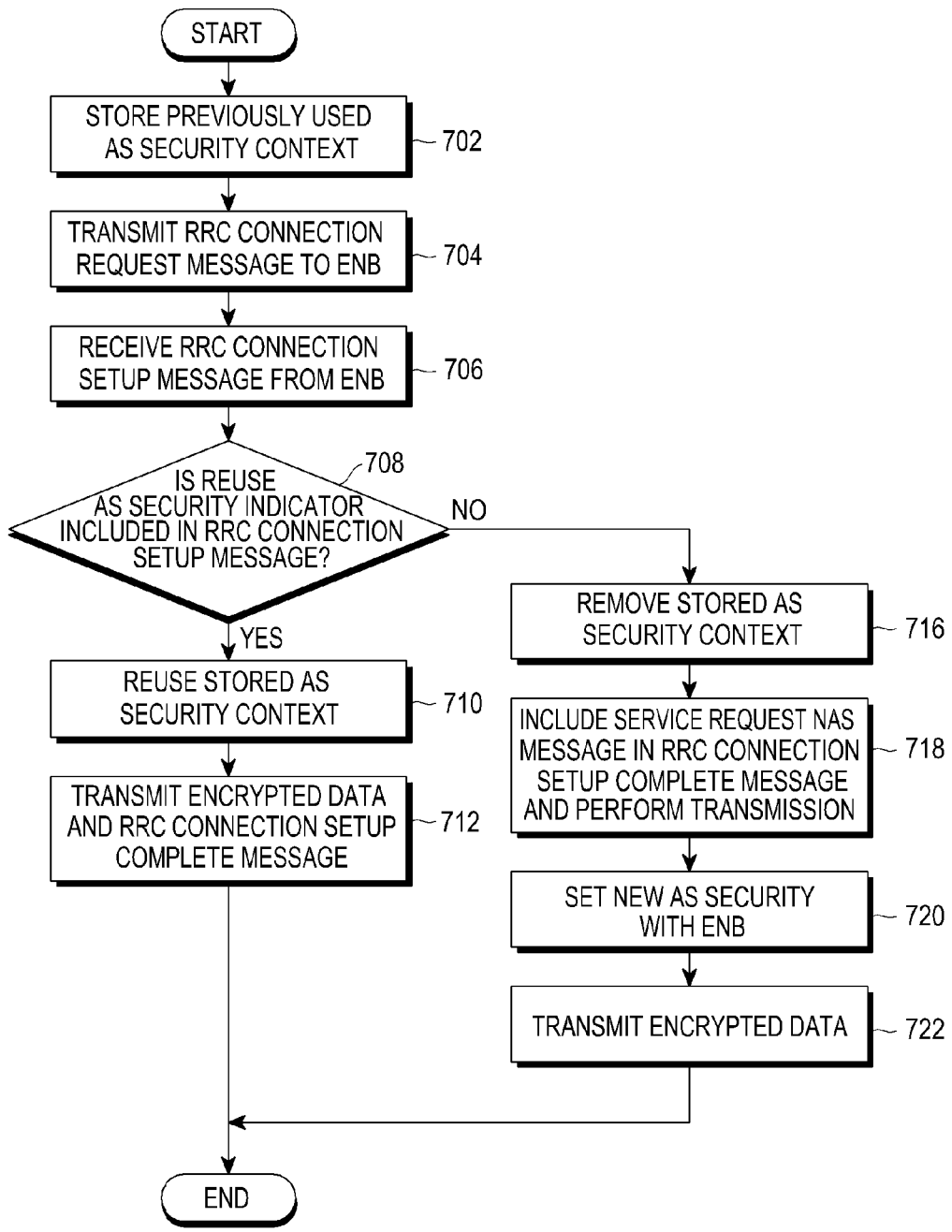
FIG. 7 illustrates an operation of a UE according to the second exemplary embodiment of the present invention.

FIG. 7 illustrates an operation of a UE according to the second exemplary embodiment of the present invention.

Referring to FIG. 7, a UE that is in an idle mode may continuously store AS security information that is used for a previous connection, in operation 702, and may transmit an RRC connection request message to an eNB in operation 704 when data needs to be transmitted. In operation 706, the UE may receive an RRC connection setup message from the eNB in response to the RRC connection request message transmitted in operation 704. When it is determined in step 708 that the message received in operation 706 includes a "Reuse AS security indicator" that instructs to reuse previously used AS security information, or another security information reuse indicator, the UE may reuse AS security information in operation 710. In operation 712, the UE may transfer, to the eNB, data encrypted through use of the reused AS security information, along with an RRC connection setup complete message, or may transfer the encrypted data by including the encrypted data in the RRC connection setup complete message.

When a security information reuse indicator is not included in the RRC connection setup message in operation 708, the UE may remove the previously stored AS security information in operation 716, and may include an NAS message in the RRC connection setup complete message and transmit the RRC connection setup complete message in operation 718. The UE may set a new AS security based on a command from the eNB in operation 720, and may transmit the encrypted data to the eNB in operation 722.

Figure 8A:
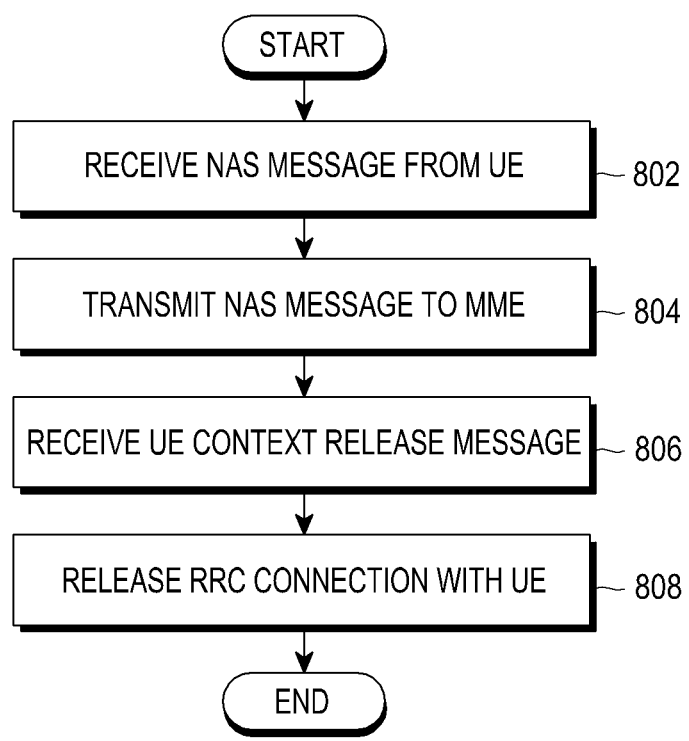
FIG. 8A illustrates an operation of an eNB according to the third exemplary embodiment of the present invention.

FIG. 8A illustrates an operation of an eNB according to the third exemplary embodiment of the present invention.

Referring to FIG. 8A, when the eNB receives an NAS message including IP data from a UE in operation 802, or receives an NAS message and IP data, the eNB may transfer the received NAS message and IP data to an MME in operation 804. In operation 806, the eNB may receive a UE context release request message from the MME, and may release an RRC connection with the UE in operation 808.

Figure 8B:
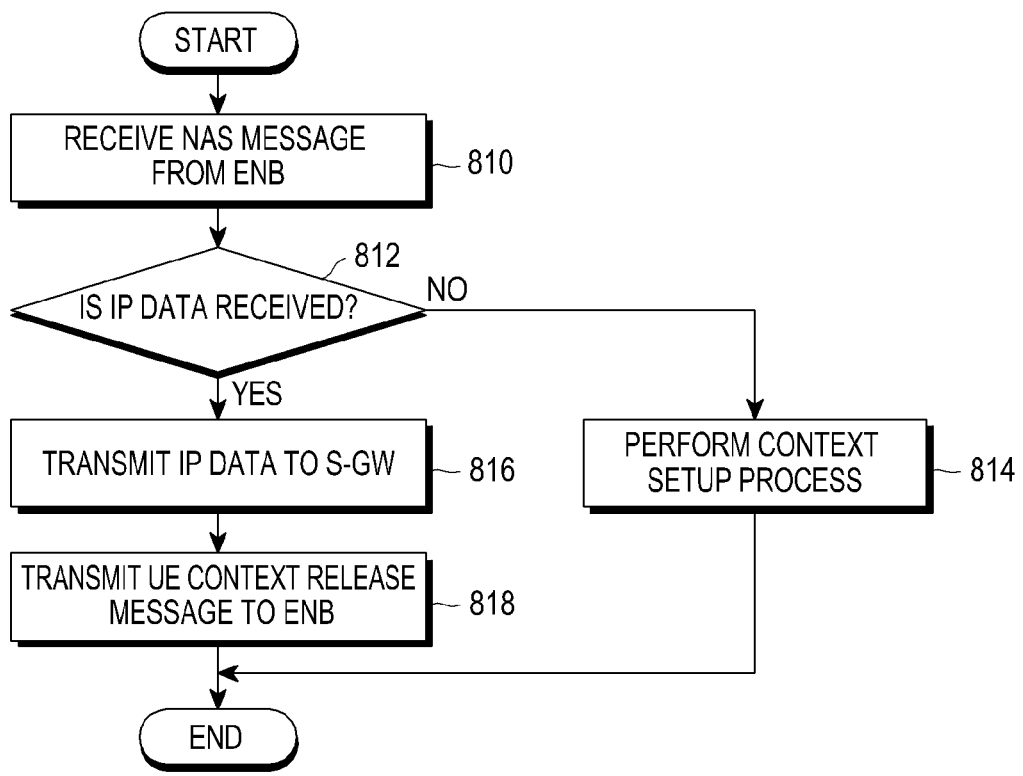
FIG. 8B illustrates an operation of an MME according to the third exemplary embodiment of the present invention.

FIG. 8B illustrates an operation of an MME according to the third exemplary embodiment of the present invention.

Referring to FIG. 8B, the MME may receive an NAS message from an eNB in operation 810, and may determine whether IP data is received in operation 812. That is, when the IP data is received along with the NAS message, when the NAS message is provided in a form newly defined for transmitting IP data, or when an indicator indicating that the IP data is included in the NAS message is included in the NAS, the MME may determine that the IP data is received, and may proceed with operation 816 so as to transmit the IP data received from the eNB to an S-GW. In operation 818, the MME may transmit a UE context release message to the eNB.

When the MME determines that the IP data is not received in operation 812, that is, when the NAS message received from the eNB may be an NAS message for setting a context, the MME may proceed with operation 814 so as to perform a general context setting process.

Figure 9:
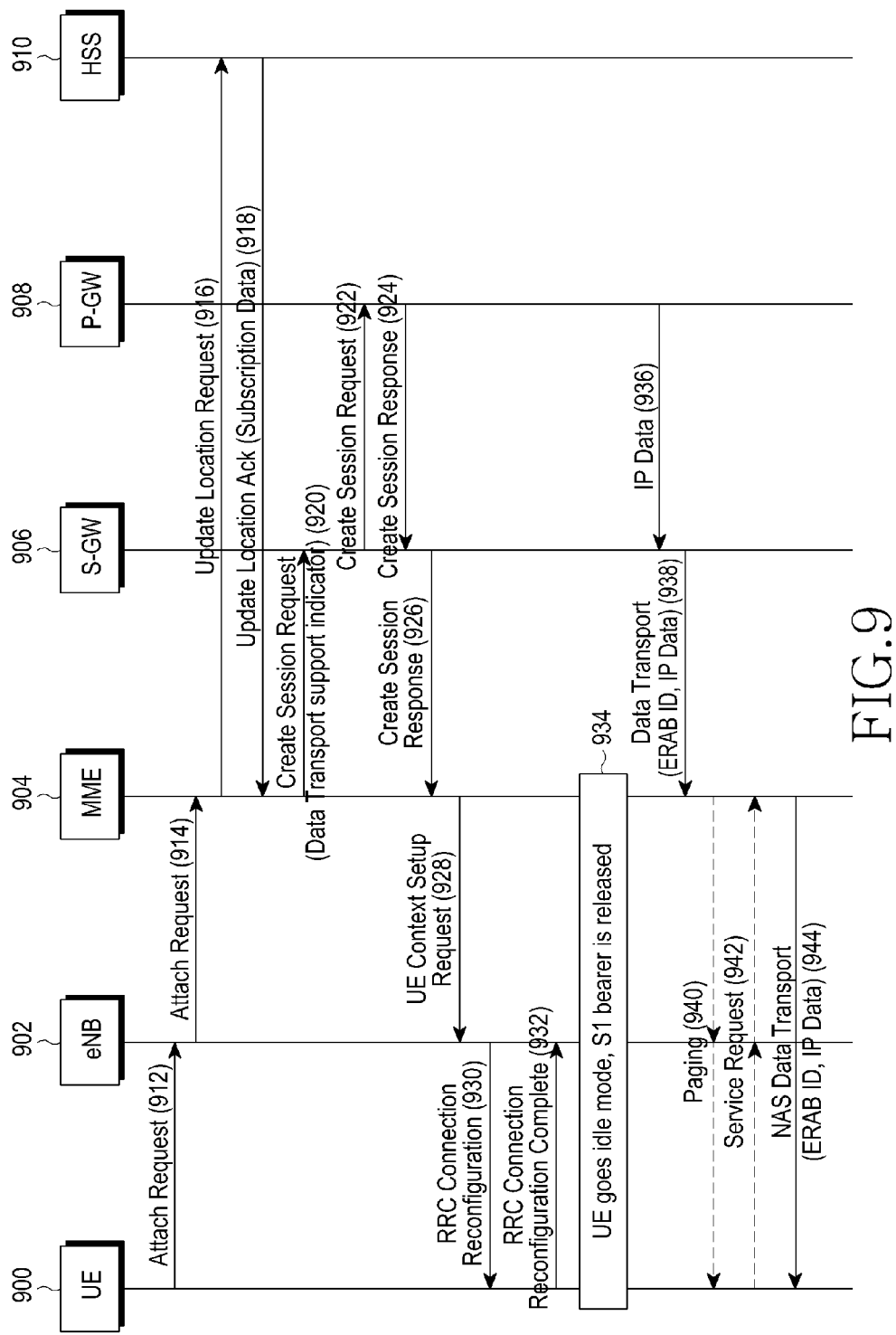
FIG. 9 is a diagram illustrating a method where an S-GW transmits received data to an MME, and the MME transfers the data to a UE, according to a fourth exemplary embodiment of the present invention.

FIG. 9 illustrates a method where an S-GW transmits received data of a UE to an MME, and the MME transfers the data to the UE again, according to a fourth exemplary embodiment of the present invention.

Referring to FIG. 9, a UE 900 transmits an Attach Request message to an eNB 902 in operation 912, and the eNB 902 may transfer the Attach Request message to an MME 904 in operation 914. Accordingly, in operation 916, the MME 904 may transmit an Update Location Request message to a Home Subscriber Server (HSS) 910 so as to report identification information of the MME 904 that is provided to a subscriber, and to request subscription data. In operation 918, the HSS 910 may include the subscription data in an Update Location Ack message, and may transfer the Update Location Ack message to the MME 904. In operation 920, the MME 904 may transmit, to an S-GW 906, a Create Session Request message that requests creation of a new S1 bearer, and a data transport support indicator that indicates that the MME 904 is capable of directly transmitting data to a UE. The S-GW 906 that receives the Create Session Request message from the MME 904 may transmit, to a PDN-GW 908, downlink S5 bearer information (S5 DL info) and a Create Request Session Request message that requests creation of an uplink S5 bearer in operation 922. In operation 924, the PDN-GW 908 may transfer, to the S-GW 906, uplink S5 bearer information (S5 UL info) and a Create Session Response message in response to the Create Session Request message received in operation 922. As circumstances demand, a condition for data transmission to the MME 904, for example, a size of a data packet, a number of data packets, and the like, may be transferred to the S-GW 906 in operation 920 or operation 924. In operation 926, the S-GW 906 may transmit, to the MME 904, uplink S1 bearer information (S1 UL info) and a Create Session Response message, in response to the Create Session Request message that requests the creation of the S1 bearer in operation 920. In operation 928, the MME 904 may transfer, to the eNB 902, a UE Context Setup Request message including the S1 UL info, along with UE context information required for providing a service from the eNB 902 to the UE 900, for example, security information, mobility limitation information of the UE 900, and the like. The eNB 902 may transmit an RRC Connection Reconfiguration message to the UE 900 in operation 930, and may receive an RRC Connection Reconfiguration Complete message from the UE 900 in operation 932 and thus, may generate a radio bearer to be used by the UE 900.

When the UE 900 is switched into an idle mode, UE context information may be removed from the eNB 902, and downlink S1 bearer information may be removed from the S-GW 906 in operation 934. In this example, when the PDN-GW 908 transmits, to the S-GW 906, IP data to be transmitted to the UE 900 in operation 936, the S-GW 906 may determine whether to directly transmit the IP data to the MME 904 or to transmit a downlink data notification message to the MME 904, based on a size of a data packet, a number of data packets, and whether the MME 904 provides data transport support. In operation 938, the S-GW 906 may directly transmit the IP data to the MME 904. In this example, information associated with a bearer to which the IP data belongs, for example, E-RAB ID may be transferred to the MME 904, along with the IP data. The MME 904 that receives the IP data from the S-GW 906 may transmit the IP data to the UE 900 through use of an NAS message in operation 944. The MME 904 may transmit a paging message to the UE 900 in operation 940, and the MME 904 may receive a Service Request message from the UE 900 in response to the paging message in operation 942. In this example, through the paging message, the IP data may be directly transferred from the MME 904 to the UE 900.

Figure 10A:
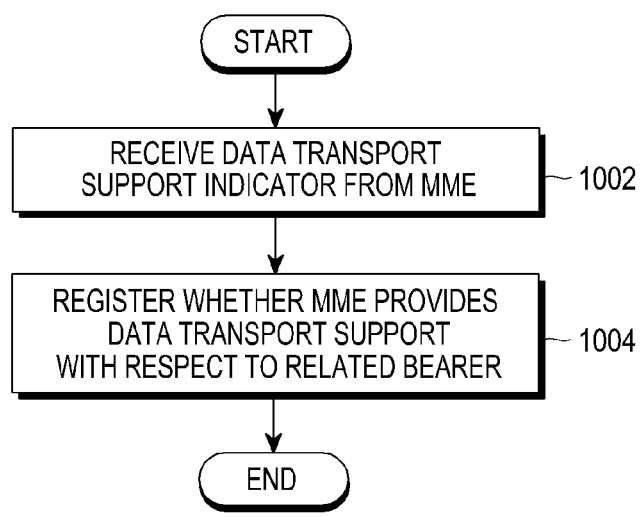
FIGS. 10A and 10B illustrate an operation of an S-GW according to the fourth exemplary embodiment of the present invention.
Figure 10B:
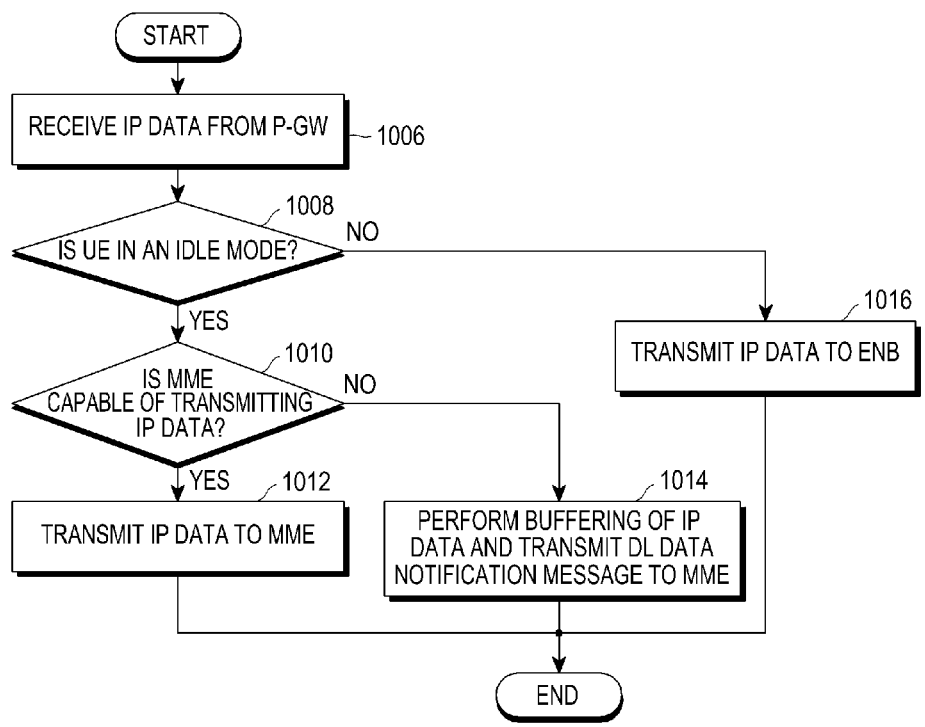

FIGS. 10A and 10B illustrate an operation of an S-GW according to the fourth exemplary embodiment of the present invention.

Referring to FIG. 10A, an S-GW that receives a data transport support indicator from an MME in operation 1002 may register that the MME provides data transport support with respect to a bearer, in operation 1004.

Referring to FIG. 10B, an S-GW that receives IP data from a PDN-GW in operation 1006 may determine whether a UE is in an idle mode in operation 1008. When the UE is in an idle mode, the S-GW may determine whether the MME provides data transport support with respect to a bearer associated with the IP data in operation 1010. In this example, whether to transmit the IP data to the UE may be determined based on a size of a data packet, a number of data packets, and the like.

When it is determined that the MME is capable of transmitting the IP data to the UE, the S-GW may transmit the IP data to the MME in operation 1012. When it is determined that the MME is incapable of transmitting the IP data in operation 1010, the S-GW may perform buffering with respect to the IP data, and may transmit a downlink data notification message to the MME in operation 1014.

When the UE is not in an idle mode in operation 1008, the UE may transmit the IP data to an eNB that is being accessed by the UE in operation 1016.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method of transmitting data in a radio communication network, the method comprising:
   receiving, by an evolved-Node B (eNB), a Radio Resource Control (RRC) connection request message from a User Equipment (UE) that was in an idle state;
   transmitting, by the eNB, an RRC connection setup message to the UE;
   receiving, by the eNB, an RRC connection setup complete message with Internet Protocol (IP) data from the UE;
   forwarding, by the eNB, the IP data received from the UE to a Mobility Management Entity (MME); and
   after the IP data is received by the MME, receiving, by the eNB, a UE context release message from the MME, and transmitting an RRC connection release message to the UE.

2. The method of claim 1, wherein the RRC connection setup complete message includes a Non-Access Stratum (NAS) message, and the IP data is included in the NAS message.

3. A method of transmitting data in a radio communication network, the method comprising:
   receiving, by a Mobility Management Entity (MME), an initial User Equipment (UE) message from an evolved-Node B (eNB) when the UE that was in an idle state accesses the eNB;

transmitting, by the MME, Internet Protocol (IP) data to a Serving GateWay (S-GW), the IP data is transmitted from the UE and received with the initial UE message; and after the IP data is transmitted to the S-GW by the MME, transmitting, by the MME, a UE context release message to release RRC connection with the UE to the eNB.

4. The method of claim 3, wherein the initial UE message includes a Non-Access Stratum (NAS) message, and the IP data is included in the NAS message.

5. The method of claim 4, wherein the MME determines that the IP data transmitted from the UE is received when at least one of a form of the NAS message is for data transmission and an indicator indicating that the IP data is included in the NAS message is included in the NAS message.

6. The method of claim 3, wherein the transmitting of the data comprises:
sending, by the MME, the IP data with a bearer identifier (ID) to the S-GW through use of a data transport message.

7. The method of claim 3, wherein the transmitting of the data comprises:
sending, by the MME, the IP data to the S-GW through use of user plane uplink information.

8. A radio communication system that transmits and receives data in a radio communication network, the system comprising:
an evolved-Node B (eNB) configured to receive a Radio Resource Control (RRC) connection request message from a User Equipment (UE) that was in an idle state, to transmit an RRC connection setup message to the UE, to receive an RRC connection setup complete message with Internet Protocol (IP) data from the UE, to forward the IP data received from the UE to a Mobility Management Entity (MME), to receive a UE context release message from the MME, and to transmit an RRC connection release message to the UE; and
the MME configured to receive, from the eNB, the initial UE message, to transmit the IP data to a Serving GateWay (S-GW), and to transmit, after the IP data is transmitted to the S-GW, the UE context release message.

9. The system of claim 8, wherein the initial UE message includes a Non-Access Stratum (NAS) message, and the IP data is included in the NAS message.

10. The system of claim 9, wherein the MME determines that the IP data transmitted from the UE is received when at least one of a form of the NAS message is for data transmission and an indicator indicating that the IP data is included in the NAS message is included in the NAS message.

11. The system of claim 8, wherein the MME sends the IP data with a bearer identifier (ID) to the S-GW through use of a data transport message.

12. A method of transmitting data in a radio communication network, the method comprising:
performing by a Mobility Management Entity (MME), location update for a User Equipment (UE);
receiving, by the MME, Internet Protocol (IP) data to be transmitted to the UE from the S-GW when the UE was in an idle state; and
transmitting the IP data with a bearer identifier (ID) in a Non-Access Stratum (NAS) transport message to an evolved Node B (eNB).

13. The method of claim 12, wherein the performing of the location update comprises:
transmitting, by the MME to the S-GW, a bearer create session request message including a data transport indicator that indicates that the MME is capable of directly transmitting data to the UE, in response to a connection request from the UE; and
receiving, by the MME, a bearer create session response message from the S-GW, and transmitting context information of the UE to an evolved-Node B (eNB),
wherein the bearer create session request message includes information associated with at least one of a size of a data packet and a number of data packets.

14. The method of claim 12, further comprising:
transmitting, by the MME, a paging message to the UE; and
receiving a service request message from the UE as response of the paging message.

15. A method of transmitting data in a radio communication network, the method comprising:
after performing negotiation between a Mobility Management Entity (MME) and a User Equipment (UE), receiving, by a Serving GateWay (S-GW) from a Packet Data Network GateWay (PDN-GW), Internet Protocol (IP) data to be transmitted to the UE when the UE was in an idle state;
monitoring, by the S-GW, a size of the IP data; and
if the size of the IP data is smaller than a predetermined value, transmitting the IP data to the MME.

16. The method of claim 15, wherein the performing comprises:
receiving, by the S-GW from the MME, a bearer create session request message including a data transport indicator indicating that the MME is capable of directly transmitting data to the UE, in response to a connection request from the UE, and registering, by the S-GW, whether the MME is capable of providing data transport support with respect to a bearer of the IP data; and
transmitting, by the S-GW, the bearer create session request message to the PDN-GW, receiving a bearer create session response message, and transmitting the bearer create session response message to the MME,
wherein the bearer create session request message includes information associated with at least one of a size of a data packet and a number of data packets.

17. The method of claim 16, wherein the bearer create session request message received from the MME includes information associated with at least one of a size of a data packet and a number of data packets.

18. The method of claim 16, wherein the bearer create session response message received from the PDN-GW includes information associated with at least one of a size of a data packet and a number of data packets.

19. The method of claim 16, wherein the S-GW determines whether the MME is capable of directly transmitting the IP data to the UE, based on at least one of the size of the data packet and the number of data packets together with the data transport indicator.

20. The method of claim 16, wherein, when the MME is incapable of directly transmitting the IP data to the UE, the method further comprises:
buffering the IP data and transmitting a downlink data notification message to the MME.

21. A radio communication system that transmits and receives data in a radio communication network, the system comprising:
a Mobility Management Entity (MME) configured to perform location update for a User Equipment (UE), to receive Internet Protocol (IP) data to be transmitted to the UE from the S-GW when the UE was in an idle state, and to transmit the IP data with a bearer identifier (ID) in a Non-Access Stratum (NAS) transport message to an evolved Node B(eNB); and a Serving GateWay (S-GW) after performing negotiation between a Mobility Management Entity (MME) and a User Equipment (UE), configured to receive Internet Protocol (IP) data to be transmitted to the UE from a Packet Data Network GateWay (PDN-GW) when the UE was in an idle state, to monitor a size of the IP data and if the size of the IP data is smaller than a predetermined value, to transmit the IP data to the MME.

22. The system of claim 21, wherein the MME transmits to a Serving GateWay (S-GW) a bearer create session request message including a data transport indicator that indicates that the MME is capable of directly transmitting data to a User Equipment (UE), in response to a connection request from the UE and receives a bearer create session response message from the S-GW, and transmitting context information of the UE to an evolved-Node B (eNB), wherein the bearer create session request message includes information associated with at least one of a size of a data packet and a number of data packets.

23. The system of claim 21, wherein the MME transmits a paging message to the UE, and receives a service request message from the UE as a response to the paging message.

24. The system of claim 22, wherein the bearer create session response message includes information associated with at least one of a size of a data packet and a number of data packets.

25. The system of claim 22, wherein the S-GW determines whether the MME is capable of directly transmitting the IP data to the UE, based on at least one of the size of the data packet and the number of data packets together with the data transport indicator.

26. The system of claim 21, wherein, when the MME is incapable of directly transmitting the IP data to the UE, the S-GW performs buffering of the data, and transmits a downlink data notification message to the MME.

27. The method of claim 1, wherein the RRC connection request message includes an indicator indicating that a small data is to be transmitted to the eNB.

28. The method of claim 1, wherein the RRC connection setup complete message includes a Non-Access Stratum (NAS) message, and the IP data is received with the NAS message.

29. The method of claim 3, wherein the initial UE message includes a Non-Access Stratum (NAS) message, and the IP data is received with the NAS message.

30. The system of claim 8, wherein the RRC connection request message includes an indicator indicating that a small data is to be transmitted to the eNB.

31. The system of claim 8, wherein the RRC connection setup complete message includes a Non-Access Stratum (NAS) message, and the IP data is received with the NAS message.

32. The system of claim 8, wherein the initial UE message includes a Non-Access Stratum (NAS) message, and the IP data is received with the NAS message.

33. The system of claim 8, wherein the MME sends the IP data to the S-GW through use of user plane uplink information.

34. The method of claim 14, wherein the MME transmits the IP data to the UE through use of the paging message.

35. The method of claim 21, wherein the MME transmits the IP data to the UE through use of the paging message.

* * * * *